US005487410A

United States Patent [19]

Niethammer

[11] Patent Number: 5,487,410

[45] Date of Patent: Jan. 30, 1996

[54] PROPORTIONAL SOLENOID VALVE UNIT

[75] Inventor: Bernd Niethammer, Nürtingen, Germany

[73] Assignee: Hydraulik-Ring Antriebs- und Steueringstechnik GmbH, Nürtingen, Germany

[21] Appl. No.: 386,377

[22] Filed: Feb. 10, 1995

[30] Foreign Application Priority Data

Feb. 10, 1994 [DE] Germany ............................ 9402205 U

[51] Int. Cl.$^{6}$ ...................................................... F16K 31/04

[52] U.S. Cl. ................................ 137/625.65; 251/129.15; 137/625.48

[58] Field of Search ......................... 137/625.34, 625.48, 137/625.65, 625.69; 251/129.15

[56] References Cited

U.S. PATENT DOCUMENTS 3,454,035 7/1969 Jespersen ....................... 137/625.34 X 4,971,116 11/1990 Suzuhi et al. ....................... 137/625.65

5,218,999 6/1993 Tarimoto ........................ 251/129.15 X

*Primary Examiner*—John C. Fox

*Attorney, Agent, or Firm*—Robert W. Becker & Associates

[57] ABSTRACT

A proportional solenoid valve has a casing with a receiving chamber. A valve housing is received in the receiving chamber. A solenoid with a push rod is connected to the valve housing, A piston is positioned in the valve housing so as to be slidable. At least one pressure spring is positioned at one end of the piston opposite the solenoid. The piston is displacable by the push rod of the solenoid against the force of the at least one pressure spring. The receiving chamber has a longitudinal extension and a constant diameter along the longitudinal extension. Flanges are provided for connecting the valve housing to the casing and the solenoid.

9 Claims, 2 Drawing Sheets

PROPORTIONAL SOLENOID VALVE UNIT

BACKGROUND OF THE INVENTION

The present invention relates to a proportional solenoid valve unit comprising a casing having a receiving chamber for a valve housing, to which valve housing a solenoid is connected. In the valve housing a piston is slidably arranged which is displacable against the force of a pressure spring by a push rod of the solenoid.

In this known valve unit the valve housing is sealed in the receiving chamber of the casing with sealing rings. Furthermore, the valve housing is provided with a threaded bore at its end face facing the solenoid in which a threaded part of the solenoid is received. The resulting unit comprised of valve housing and solenoid is secured with a sheet metal member and fastened to a casing. In order to prevent damage to the sealing rings of the valve housing during mounting of the unit into the casing, the casing, respectively, its receiving chamber must be provided with insertion slants at the end of the receiving chamber. This leads to additional manufacturing steps during manufacture of the receiving chamber. Furthermore, the valve housing must be provided in complicated manufacturing steps with grooves for insertion of the sealing rings. The threaded bore also requires a difficult and expensive manufacture. Furthermore, securing the unit comprised of valve housing and solenoid with a sheet metal member is complicated, especially in view of the fact that for this purpose an additional component in the form of the sheet metal member and corresponding screws are required. Thus, this proportional solenoid valve unit of the prior art is expensive to manufacture and difficult to assemble.

It is therefore an object of the present invention to improve a proportional solenoid valve unit of the aforementioned kind such that it is comprised of only few components that are preferably standardized components and that can be inexpensively and simply manufactured and mounted.

SUMMARY OF THE INVENTION

A proportional solenoid valve unit according to the present invention is primarily characterized by:

A casing with a receiving chamber;

A valve housing received in the receiving chamber;

A solenoid with a push rod connected to the valve housing;

A piston positioned in the valve housing so as to be slidable;

At least one pressure spring positioned at one end of the piston opposite the solenoid;

The piston displacable by the push rod of the solenoid against the force of the at least one pressure spring;

The receiving chamber having a longitudinal extension and a constant diameter along the longitudinal extension; and Flange means for connecting the valve housing to the casing and the solenoid.

Advantageously, the valve housing has at least one annular groove for receiving a first one of the flange means connected to the casing.

Preferably, the casing has a projection and the first flange means is connected to the projection.

Expediently, the valve housing has an annular projection and a second one of the flange means is connected to the annular projection.

In a preferred embodiment of the present invention the solenoid has a connecting portion and the annular projection of the valve housing engages the connecting portion.

Preferably, the first and second flange means are located at opposite ends of the valve unit.

Advantageously, the valve housing has at least one plastically deformable section for supporting the at least one pressure spring.

Preferably, the valve housing has an annular projection and the at least one plastically deformable section is a tongue bent from the annular projection.

Advantageously, the piston has a transverse center plane and is symmetrical to the transverse center plane.

In the inventive proportional solenoid valve unit the receiving chamber of the casing has a constant diameter along its longitudinal extension. Accordingly, this receiving chamber can be produced in a single manufacturing step, for example, by drilling. The receiving chamber has no steps or threads. Thus, the valve housing can be provided with a smooth outer wall that contacts in a sealing manner the inner wall of the receiving chamber of the casing. Additional sealing rings are no longer required. The sealing action is ensured by engagement between the inner wall of the receiving chamber of the casing and the outer wall of the valve housing. The connection of the valve housing to the casing and the solenoid is achieved with flange means that can be easily produced. The inventive proportional solenoid valve unit thus comprises only few components that can be manufactured inexpensively. Assembling the components does not require additional manufacturing or method steps. Accordingly, the inventive proportional solenoid valve unit can be manufactured and mounted extremely inexpensively and very easily.

BRIEF DESCRIPTION OF THE DRAWINGS

The object and advantages of the present invention will appear more clearly from the following specification in conjunction with the accompanying drawings, in which.

DESCRIPTION OF THE PREFERRED EMBODIMENTS

Figure 1:
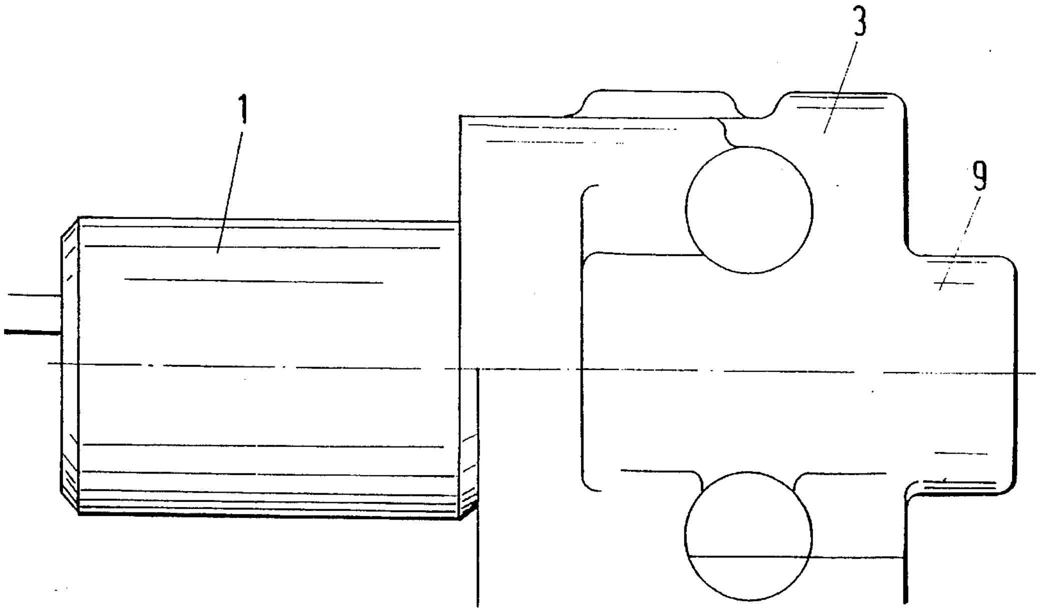
FIG. 1 shows a side view of an inventive proportional solenoid valve unit which is inserted into a casing.

The present invention will now be described in detail with the aid of several specific embodiments utilizing FIGS. 1 and 2.

The proportional solenoid valve unit serves to control a non-represented consuming device. Such a consuming device can be, for example, a piston/cylinder unit that is, for example, part of the power steering system of a motorized vehicle. The proportional solenoid valve unit has a solenoid 1 which is of a conventional design and therefore not described in detail. The solenoid 1 comprises a push rod 2 (FIG. 2) that is displaced in the axial direction upon exciting the solenoid 1. With the push rod 2 the piston 3 is displaced counter to the force of the pressure spring 4. The piston 3 and the pressure spring 4 are arranged within the valve housing 5 that is connected within the casing 6.

Figure 2:
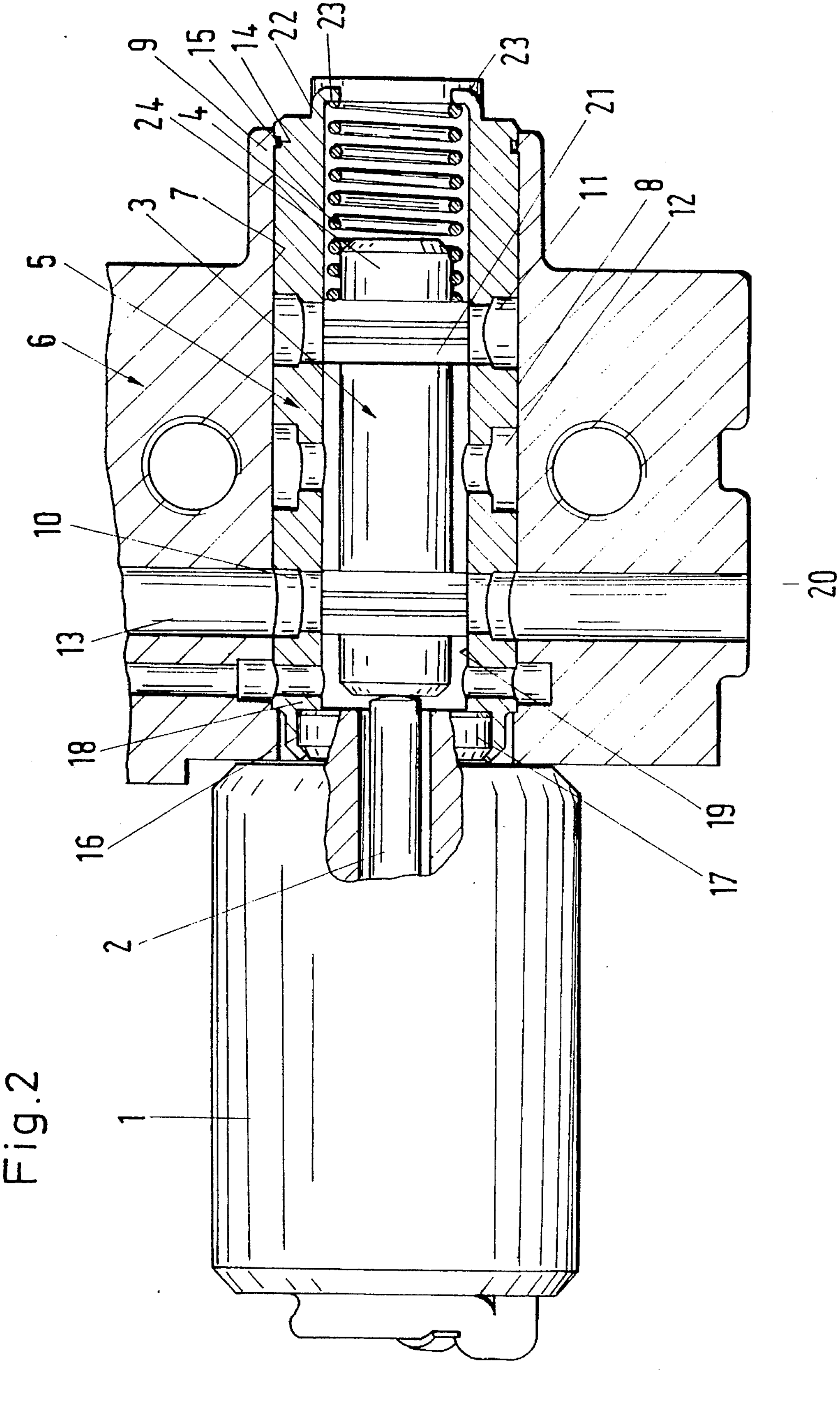
FIG. 2 shows an enlarged representation of the inventive proportional solenoid valve unit, partly in section and partly as an elevated view.

As shown in FIG. 2, the casing 6 has a receiving chamber 7 that has a constant diameter over its entire longitudinal extension and that extends through the casing 6 from end to end. Accordingly, this receiving chamber 7 can be manufactured in a single manufacturing step. Into this receiving chamber 7 the valve housing 5 can be easily inserted. The valve housing 5 thus contacts with its cylindrical outer wall 8 the inner wall of the receiving chamber 7. The casing 6 has an annular projection 9 at its end face facing away from the solenoid 1. This annular projection 9 is penetrated by the receiving chamber 7. The valve housing 5 extends axially past the annular projection 9.

The valve housing 5 has no grooves for insertion of sealing rings on its exterior wall 8. The sealing between the casing 6 and the valve housing 5 is achieved exclusively by overlapping or matching of the inner wall of the receiving chamber 7 and the outer wall 8 of the valve housing 5.

The valve housing 5 has two hydraulic connectors 10 and 11 as well as a pressure connector 12 arranged therebetween in the longitudinal direction. The casing 6 is provided with bores that are aligned with the hydraulic connectors 10, 11 whereby in FIG. 2 only the bore 13 connected to the hydraulic connector 10 is represented. The pressure connector 12 is connected via a non-represented bore in the casing 6 to the pump of the hydraulic system which is also not represented in the drawings. Via the pressure connector 12 the hydraulic medium is supplied to the valve unit and depending on the position of the piston 3 is supplied to the hydraulic connector 10 or the hydraulic connector 11. The valve housing 5 is provided with an annular groove 14 in the vicinity of the end face which is adjacent to the solenoid 1. The projection 9 of the casing 6 with its flange means 15 engages the annular groove 14. The projection 9 has a wall thickness such that the flange means 15 can be easily applied after insertion of the valve housing 5 into the receiving chamber 7 of the casing 6. In this manner, the valve housing 5 and the casing 6 can be easily connected with one another.

The end face of the valve housing 5 which is facing the solenoid 1 is provided with a thin-walled sleeve-type projection 16 that engages a cylindrical connecting portion 17 of the solenoid 1. The cylindrical projection 16 is flanged inwardly at a slant and engages over the connecting portion 17 which is conically shaped in this area. It is also possible to provide the cylindrical projections 16 of the valve housing 5 with tongues distributed over its circumference and bent inwardly at a slant. In this manner it is also possible to provide a form-fitting connection between the solenoid 1 and the valve housing 5 that acts in the axial direction. The projection 16 projects from the end face 18 of the valve housing 5. The connecting portion 17 rests at this end face 18 which is penetrated by the central bore 19 of the valve housing 5. The push rod 2 of the solenoid 1 thus extends into the bore 19 and rests at the end face of the piston 3.

The piston 3 is mirror-symmetrical to its transverse center plane. For mounting it in the valve housing 5, it is thus of no consequence which free end is inserted into the valve housing. The piston 3 is provided with two annular stays 20 and 21 that are spaced from one another. Their width is slightly greater than the width of the hydraulic connectors 10 and 11. In the center position of the piston 3 represented in FIG. 2 the two hydraulic connectors 10 and 11 are closed by the annular stays 20, 21 of the piston 3.

The free end or end face of the valve housing 5 which is remote from the solenoid 1 is provided with an axially projecting cylindrical projection 22. The projection 22 is provided with axial cuts in order to provide plasticly deformable tongues 23. The tongues 23 thus can be bent axially inwardly bent. The tongues 23 serve for axially securing the pressure spring 4. By plastically deforming the tongues 23 at various degrees, they can be bent such that the pressure spring 4 has a required prestress for a desired application.

The piston 3 should assume the center position represented in FIG. 2 at a predetermined amperage supplied to the solenoid 1. In this center position the hydraulic connectors 10, 11 of the valve housing 5 are closed by the two annular stays 20, 21 of the piston 3. During assembly of the valve unit the solenoid 1 is loaded with a respective predetermined amperage so that the push rod 2 extends axially from the solenoid 1 and displaces the piston 3 to the right in FIG. 2. While the solenoid is supplied with current, the tongues 23 are plastically deformed inwardly to such an extent that the annular stays 20, 21 of the piston 3 close the hydraulic connectors 10, 11. In this manner the valve unit can be adjusted during assembly in a simple manner exactly such that, for a predetermined current supplied to the solenoid, the hydraulic connectors 10, 11 are reliably closed. The tongues 23 thus secure not only the pressure spring 4 in its mounted position, but also serve as an adjusting means in order to adjust the valve unit as a function of the respective current supplied to the solenoid. While in conventional valve housings an adjusting screw is required for axially supporting the pressure spring and a corresponding thread must be manufactured, in the inventive valve housing the adjusting screw as well as the manufacture of the thread are obsolete. With the inventive valve unit an expensive component is thus obviated, and an expensive and complicated manufacture is also avoided. However, these measures have no disadvantageous effect on the function and especially the adjustability of the valve unit.

Since the two annular stays 20, 21 are positioned at a distance from the free ends of the piston 3, the piston end 24 projects into the pressure spring 4. Advantageously, the outer diameter of the piston end 24 corresponds to the inner diameter of the pressure spring 4 which is thus safely guided at the piston end 24.

The described valve unit with solenoid 1 can be manufactured and mounted inexpensively with only a few components and can be inserted inexpensively and easily into the casing 6. It is especially advantageous that no difficult and expensive manufacturing steps for the manufacture of the casing 6 and the valve housing 5 are required.

The present invention is, of course, in no way restricted to the specific disclosure of the specification and drawings, but also encompasses any modifications within the scope of the appended claims.

What I claim is:

1. A proportional solenoid valve unit comprising:

a casing with a receiving chamber;

a valve housing received in said receiving chamber;

a solenoid with a pushrod connected to said valve housing;

a piston positioned in said valve housing so as to be slidable;

at least one pressure spring positioned at one end of said piston opposite said solenoid;

said piston displaceable by said pushrod of said solenoid against the force of said at least one pressure spring;

said receiving chamber having a longitudinal extension and a constant diameter along said longitudinal extension; and flange means for connecting said valve housing to said casing and said solenoid.

2. A valve unit according to claim 1, wherein said valve housing has at least one annular groove for receiving a first one of said flange means connected to said casing.

3. A valve unit according to claim 2, wherein said casing has a projection and wherein said first flange means is connected to said projection.

4. A valve unit according to claim 2, wherein said valve housing has an annular projection and wherein a second one of said flange means is connected to said annular projection.

5. A valve unit according to claim 4, wherein said solenoid has a connecting portion and wherein said annular projection of said valve housing engages said connecting portion.

6. A valve unit according to claim 4, wherein said first and said second flange means are located at opposite ends of said valve unit.

7. A valve unit according to claim 1, wherein said valve housing has at least one plastically deformable section for supporting said at least one pressure spring.

8. A valve unit according to claim 7, wherein said valve housing has an annular projection and wherein said at least one plastically deformable section is a tongue bent from said annular projection.

9. A valve unit according to claim 1, wherein said piston has a transverse center plane and is symmetrical to said transverse center plane.

* * * * *